Feb. 5, 1952     E. B. CLEMONS     2,584,672
DIFFERENTIAL STEERING MECHANISM FOR VEHICLES
Filed July 24, 1948                            2 SHEETS—SHEET 1

Inventor
Everett B. Clemons

By W. S. McDowell

Attorney

Feb. 5, 1952     E. B. CLEMONS     2,584,672
DIFFERENTIAL STEERING MECHANISM FOR VEHICLES
Filed July 24, 1948     2 SHEETS—SHEET 2

Inventor
Everett B. Clemons
By W. S. McDowell
Attorney

Patented Feb. 5, 1952

2,584,672

UNITED STATES PATENT OFFICE 2,584,672

DIFFERENTIAL STEERING MECHANISM FOR VEHICLES

Everett B. Clemons, Columbus, Ohio

Application July 24, 1948, Serial No. 40,583

2 Claims. (Cl. 280—103)

The present invention relates to vehicle steering apparatus, and has particular reference to an improved differential steering mechanism for various vehicles of the type having turnable pairs of wheels, and is utilized to impart an unequal turning movement to the individual wheels of the vehicle in order that relatively sharp turns may be made with the vehicle without causing skidding or sliding of one or both of the wheels such as occurs when such wheels are at all times in parallelism during a turn.

In the past, the normal steering wheels of a vehicle, usually the front wheels thereof, were generally so connected together as to maintain the same in relative parallel planes at all times during a turn. It will be manifest, that such an arrangement necessitates a certain amount of slippage or skidding of the wheels, particularly in sharp turns, due to the fact that the axes of the wheels, when in parallelism in a turn are not in true radial alignment with the center of turning radius. To overcome this undesirable slippage or skidding of the wheels of a vehicle when the same is turning, it becomes necessary that the wheel toward the inside of the turn assume a relatively greater angularity toward the direction of turn than the wheel which is toward the outside of the turn in order that the axes of the wheels be maintained at all times in true radial alignment with the center of turning radius.

For many years, a solution to the problem of steering wheel slippage during turns has been sought, and many attempts have been made to provide apparatus which permits differential turning movement of the steering wheels of a vehicle to maintain the same at the correct angularity with respect to the longitudinal axis of the vehicle in order that the axes of the steering wheels be maintained in radial alignment with the center of turning radius. One such apparatus is proposed in United States Patent No. 1,472,940, issued November 6, 1923, to Ross.

Accordingly, it is the primary object of this invention to provide a differential type of steering mechanism for vehicles, such as, farm wagons, trucks, automobiles, and the like which is mechanically efficient in effecting a progressive change in the angularity of the steering wheels of a vehicle during a turn, in order that the axes of the wheels may at all times remain in true radial alignment with the center of the turning radius to prevent slippage or skidding of the wheels.

It is another object of the present invention to provide a differential steering mechanism of the character aforementioned which comprises but few and relatively simple component parts, and which may be easily adapted for use in connection with present day vehicles with but slight structural modification thereto.

For a further and more complete understanding of the present invention and the objects and advantages realized thereby, reference is made to the following description and the accompanying drawings, wherein.

Figure 1:
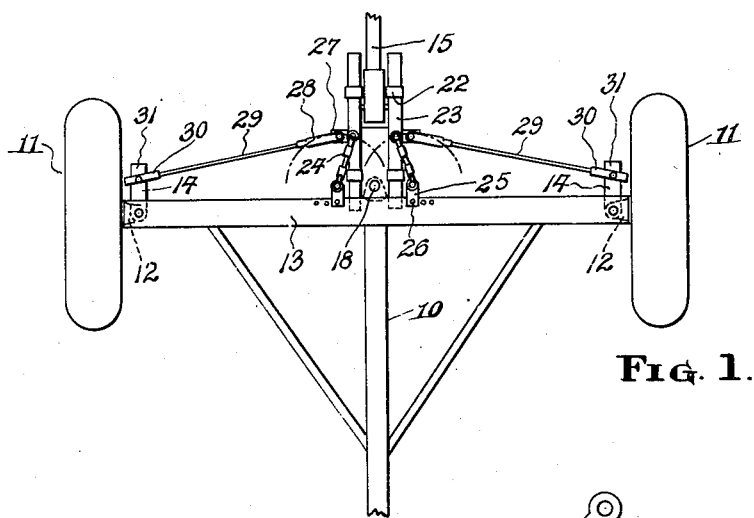
Fig. 1 is a top plan view of a differential steering mechanism formed in accordance with the present invention and operatively installed upon the frame of the ordinary farm wagon.

Referring now to the drawings, it will be seen that the present differential steering mechanism may advantageously be used upon or in conjunction with the standard type farm wagon, whose frame or chassis is indicated by the numeral 10, and which is provided with a pair of independently mounted steering wheels 11 which are rotatably carried upon axle members 12. In the usual manner, the individual axle members 12 are pivotally mounted at the ends of a transverse axle frame 13 for swinging movement in a substantially horizontal plane. Each of the axle members 12 is provided with an angularly disposed steering or turning arm 14 which, in the present instance, is shown extending forwardly in substantially 90° angularity with respect to the individual axle members. While the mechanism of the present invention is described in detail in connection with a farm wagon, or similar vehicle, it will be understood that the same may be used with facility in connection with other vehicles such as automobiles or automotive trucks of a type having a pair of independently supported steering wheels.

Pivotally connected with the central portion of the transverse axle frame 13, intermediate the steering wheels 11, is a forwardly projecting steering bar or tongue 15. The steering bar 15 is carried upon the transverse axle frame 13 for pivotal swinging movement in a substantially horizontal plane, and connection between the two members is established by means of a lug 16 which is rigidly connected with the axle frame 13, and which is provided with a central vertical opening 17 for the reception of a pivot pin 18 which passes through a pair of vertically spaced ears formed on the steering bar 15 and the opening 17 of the bearing lug 16, to provide a pivotal connection therebetween. Preferably, the steering bar or tongue 15 is formed with a pair of angle iron side plates 19 between which is positioned a solid member 20 preferably formed from wood or other suitable lightweight material. The bottom of the steering bar is rendered flat by means of a metallic plate 21 which extends across the steering bar and joins the side plates 19 substantially at the outer ends thereof.

Carried in longitudinally spaced relation along the upper side of the side plates 19 of the steering tongue 15, are spaced sets of rectangular collars 22. The upper portion of the side plates 19 comprise the bottom wall of the collars 22 which are rigidly carried in connection with the side plates of the steering tongue.

Figure 5:
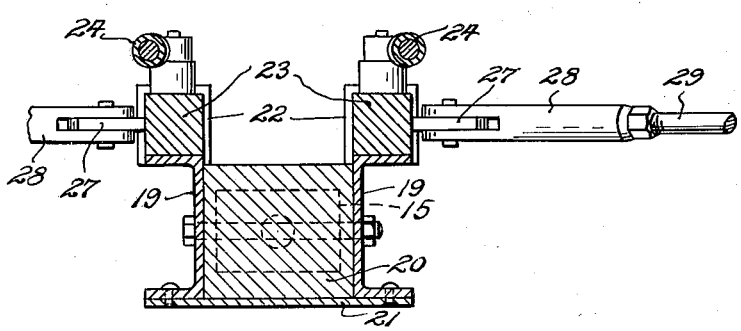
Fig. 5 is a similar view taken along the line 5—5 of Fig. 3.

Slidably carried within the rectangular collars 22 of the steering tongue 15, are a pair of push rods 23 which possess a generally rectangular cross-sectional configuration, as indicated particularly in Fig. 5 of the drawings. Thus, the push rods 23 are mounted in a manner to slide freely longitudinally of the steering bar within the collars 22.

Figure 2:
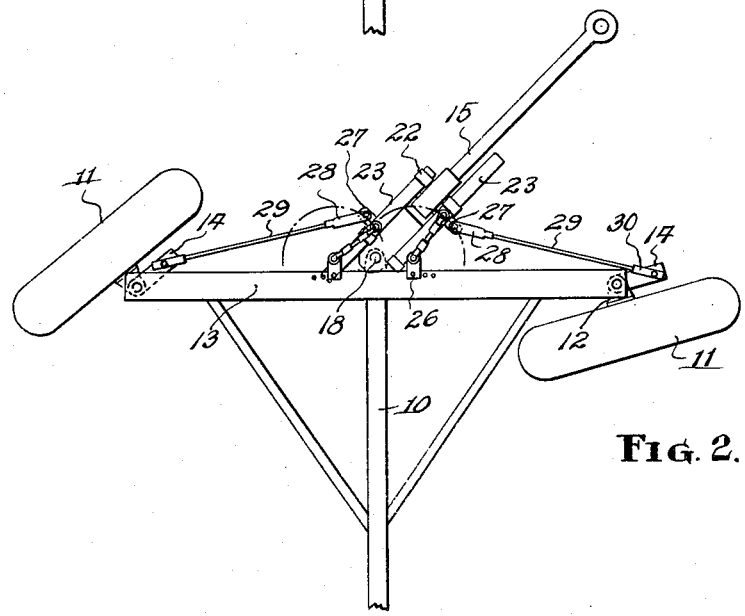
Fig. 2 is a similar view showing the unequal angularity of the steering wheels of the vehicle during a relatively sharp turn.
Figure 3:
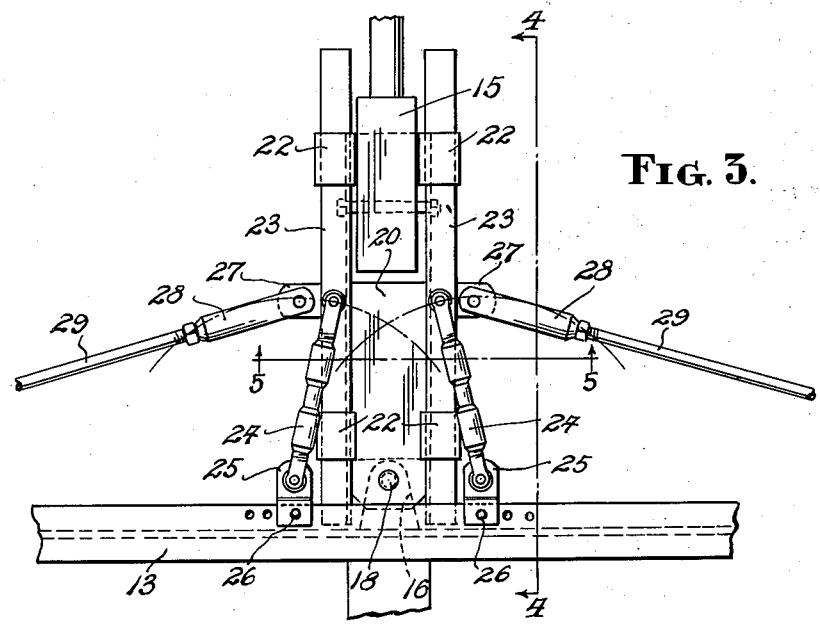
Fig. 3 is an enlarged fragmentary top plan view of the central portion of the present steering mechanism.
Figure 4:
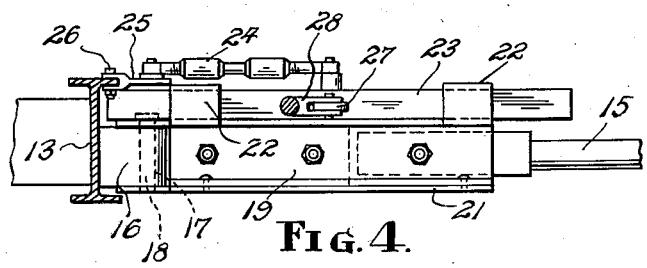
Fig. 4 is a vertical sectional view taken along the line 4—4 of Fig. 3.

Pivotally joined with the intermediate portion of the push rods 23, at the upper surface thereof, are a pair of turnbuckle links 24, whose outer ends are, in turn, pivotally connected with a pair of brackets 25 carried upon the transverse axle frame 13 on either side of the pivotally mounted steering bar 15. The brackets 25 are adjustable longitudinally along the axle frame 13 by means of removable pins 26 which extend through registering openings formed in the bifurcated inner ends of the brackets and the axle frame 13. The adjustment of the brackets 25 provides for a variance in the angularity of the turnbuckle links 24 with respect to the steering bar 15. As shown particularly in Figs. 1 and 2 of the drawings, horizontal swinging movement of the steering tongue or bar 15 results in opposite longitudinal relative movement of the two push rods 23 due to their connection with the stationary axle frame 13 by means of the turnbuckle links 24. At the same time, swinging movement of the steering bar 15 results in a sidewise displacement of the push rods simultaneously with the opposite reciprocating sliding movement thereof.

Extending laterally outwardly from the push rods 23 in the vertical plane of the pivotal connection of the turnbuckle links 24 are a pair of connecting ears 27 to which are pivotally connected the bifurcated ends of a pair of connecting rod links 28. The links 28 are screwthreadedly connected with the ends of a pair of connecting rods 29 whose opposite ends are provided with similar bifurcated connecting links 30 which are, in turn, pivotally connected, as at 31, with the steering arms 14 of the axle members 12. In the usual manner, the screwthreaded connections between the end links 28 and 30 of the connecting rods 29 provide a turnbuckle adjustment whereby the effective lengths of the connecting rods may be adjusted.

The present assembly, as thus described, provides for the simultaneous swinging of the push rods in association with the swinging of the steering bar 15. At the same time, due to the connection between the push rods and the stationary axle frame 13, the connecting ears 27, carried in vertical alignment with the pivotal connection between the push rods and links 24, will move in a substantially arcuate path described about the pivotal connection of the links 24 with the axle frame 13. Thus, during pivotal swinging movement of the steering bar 15, the ears 27, and connecting links 28 will be displaced along an arcuate path, to displace the associated connecting rods 29 and turning arms 14 in unequal proportions. For instance, in viewing Fig. 1 and 2 of the drawings, as the steering bar 15 is displaced toward the right, the displacement of the right connecting rod and right steering wheel is greater than that of the left connecting rod and steering wheel, due to the unequal arcuate displacement of the ears 27 to which the connecting rods are attached. It will be seen, that as the turning angle of the steering bar 15 is increased away from neutral, or out of perpendicular relation to the axle frame 13, the consequent rate of turn of the wheel upon the inside of the turn is greater, and increases in direct proportion to the increased angularity of the steering bar. By the same token, the rate of turning within the outside wheel decreases as the angularity of the steering bar increases.

As will be understood, the turning radius of a vehicle is determined by the length of the vehicle, and consequently, the adjustment provided with respect to the brackets 25, enables the present assembly to be adjusted to eliminate all skidding of the steering wheels during a turn and to insure that the axes of the steering wheels are at all times maintained in radial alignment with the center of turning radius of the vehicle. Changes in the angularity of the links 24 with respect to the steering bar 15, when the latter is taken in its neutral position, will result in a variance in the rate of angular turning movement within the separate steering wheels. In practice, the correct angularity may be established for a given vehicle by trial and error by adjusting the turnbuckle links 24 longitudinally of the axle frame 13 until the desired rate of change in angularity of the steering wheels is obtained, and no skidding of the wheels is apparent during any angular turn.

In view of the foregoing, it will be seen that the present invention provides a structually simple, yet mechanically efficient assembly for imparting differential steering movement to the individual steering wheels of a vehicle. The present invention is further characterized by its ease of assembly or installation upon present day vehicles, and its adjustability with respect thereto, as well as its economy of manufacture and maintenance.

While a present preferred embodiment of this invention has been disclosed in detail, it will be understood that various modifications may be accomplished without departing from the spirit of the invention or the scope of the following claims.

I claim:

1. In a differential steering mechanism for vehicles having a pair of ground wheels rotatably carried upon individual axle members mounted for turning movement at the respective ends of a transverse axle frame; an elongated steering lever pivotally connected at one end to a stationary member of the vehicle centrally between said wheels for swinging movement in a substantially horizontal plane; means carried on opposite sides of said lever for independent limited sliding movement longitudinally of said lever; a pair of longitudinally extensible links pivotally connected at one of their ends with said last-named means and at their opposite ends with a stationary member of the vehicle in transversely spaced relation on opposite sides of the pivotal connection of said steering lever therewith; means for adjusting the transverse spacing of the said opposite ends of said links with respect to the pivotal connection between said steering lever and the stationary member of the vehicle; and tie rods pivotally connected at their respective ends between said first-named means and the axle members of the vehicle for imparting turning movement to the axle members in response to sliding movement of said first-named means.

2. A differential steering mechanism for vehicles having a pair of ground wheels rotatably carried upon axle members mounted for turning movement in a substantially horizontal plane on either side of the vehicle, said mechanism comprising a pair of turning arms rigidly carried by the axle members of the vehicle in angular relation thereto; an elongated steering bar pivotally connected at one end with a stationary member of the vehicle intermediate the wheels thereof for swinging movement in a substantially horizontal plane; a pair of reciprocable sliding members carried on opposite sides of said steering bar for limited sliding movement longitudinally therof; a pair of elongated, longitudinally extensible links, each pivotally connected at one end with one of said sliding members, and having their opposite ends pivotally connected with the stationary member of the vehicle on opposite sides of said steering bar, each of said links occupying a corresponding angular relationship with respect to the stationary member of the vehicle and said sliding members when the wheels of said vehicle occupy straight forward positions; and tie rods pivotally connected with and joining said sliding members with said turning arms, said tie rods serving to impart individual turning movement to the wheel-carrying axle members of the vehicle upon swinging movement of said steering bar and in accordance with the displacement of said sliding members.

EVERETT B. CLEMONS.

REFERENCES CITED

The following references are of record in the file of this patent:

UNITED STATES PATENTS

| Number | Name | Date |
| --- | --- | --- |
| 358,395 | Hornbeck | Feb. 22, 1887 |
| 718,663 | Shearer | Jan. 20, 1903 |
| 1,379,982 | Hartsock | May 31, 1921 |
| 1,472,940 | Ross | Nov. 6, 1923 |
| 1,846,651 | Orelind | Feb. 23, 1932 |

FOREIGN PATENTS

| Number | Country | Date |
| --- | --- | --- |
| 55,400 | Denmark | Oct. 31, 1938 |
| 274,498 | Germany | May 26, 1914 |
| 662,333 | Germany | July 11, 1938 |